March 18, 1969 L. F. CARRIERI ET AL 3,433,086
MULTISPEED DRIVING MECHANISMS
Filed July 12, 1967 Sheet 1 of 3
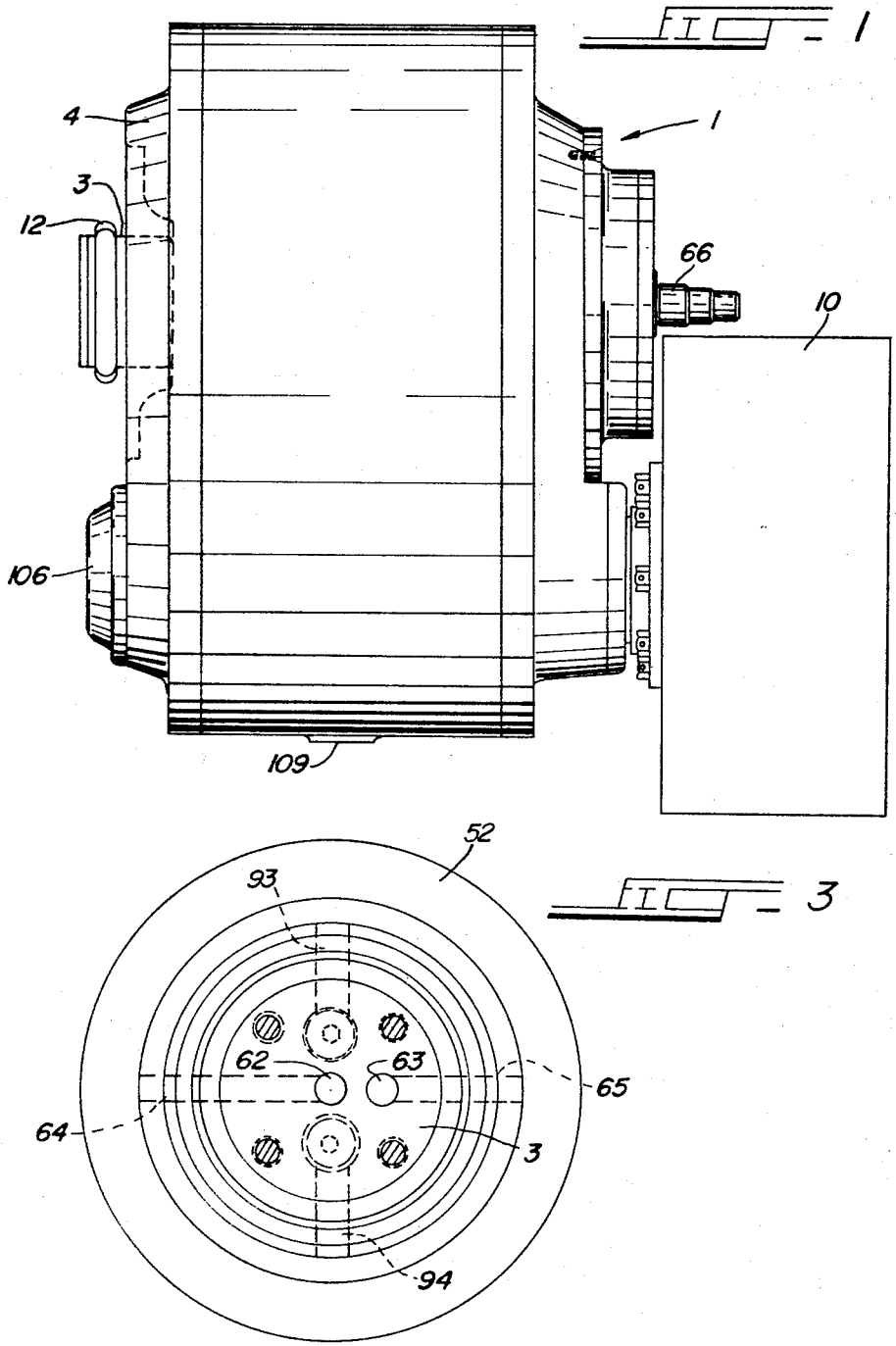
INVENTORS.
LOUIS F. CARRIERI
NORTON D. SKINNER

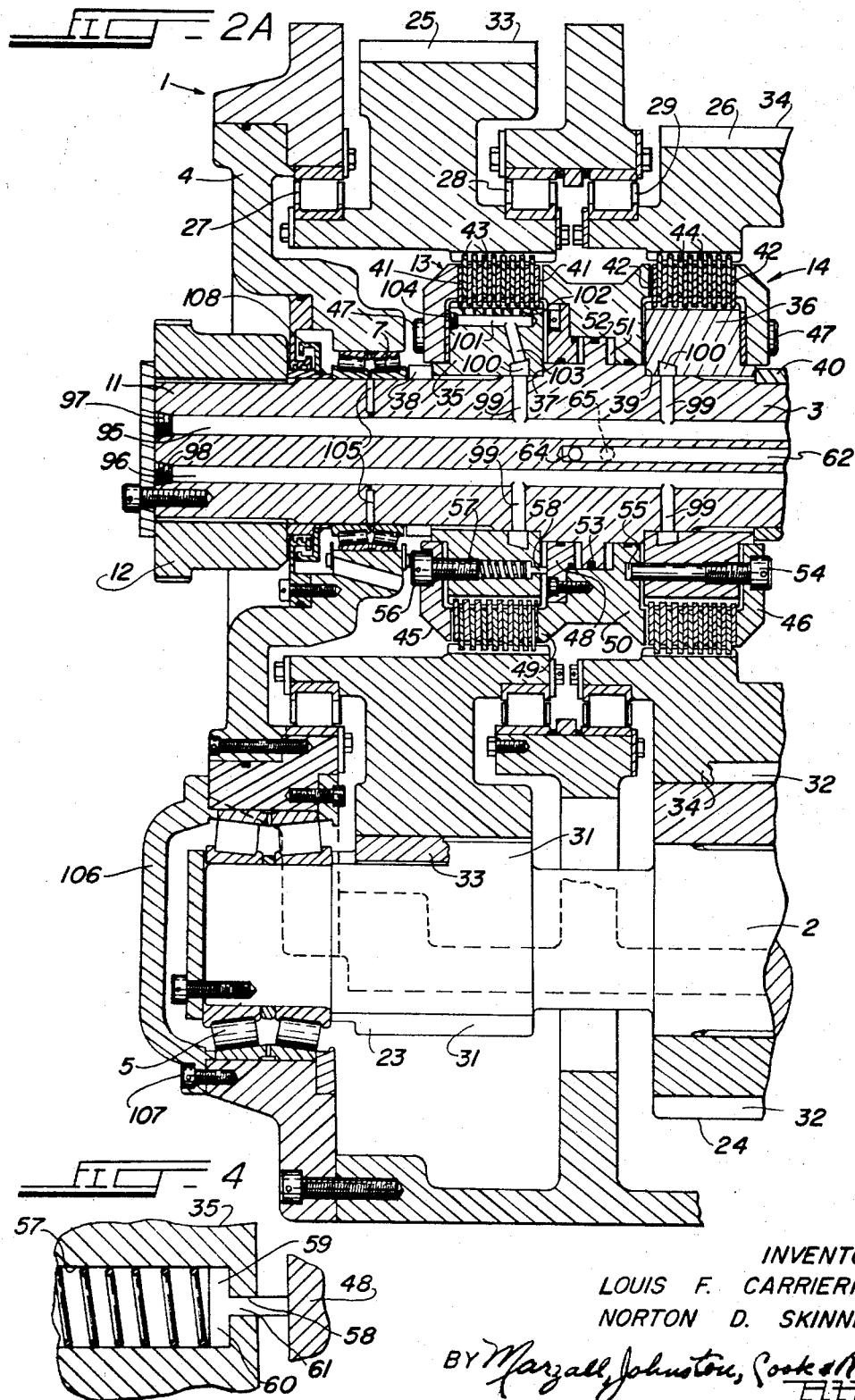

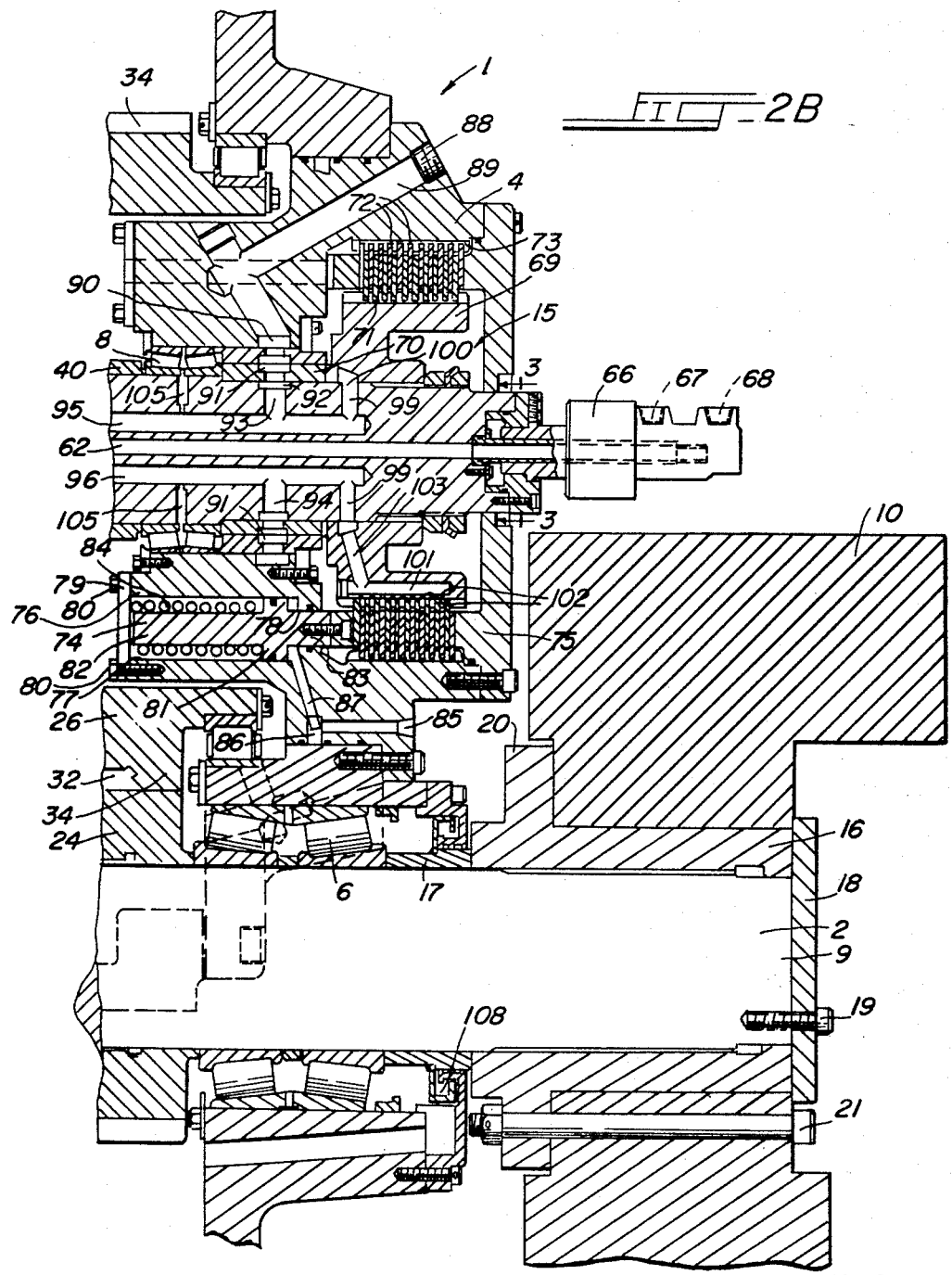

United States Patent Office 3,433,086
Patented Mar. 18, 1969

3,433,086
MULTISPEED DRIVING MECHANISMS
Louis F. Carrieri, La Grange Park, and Norton D. Skinner, Palos Heights, Ill., assignors to U.S. Industries, Inc., New York, N.Y., a corporation of Delaware
Filed July 12, 1967, Ser. No. 652,821
U.S. Cl. 74—364        15 Claims
Int. Cl. F16h 3/08

ABSTRACT OF THE DISCLOSURE

A multispeed driving mechanism embodying a drive shaft, a driven shaft, a plurality of gear trains driven by the drive shaft at all times during rotation of the latter, and selectively actuated clutch elements carried by the gear trains and driven shaft for selectively coupling the drive shaft to the driven shaft through respective ones of the gear trains.

Background of the invention

This invention relates to multispeed driving mechanisms, and, more particularly, to multispeed driving mechanisms which are particularly well adapted for rotating the drive shaft of mechanical metal drawing presses, and the like, at a plurality of selected speeds.

It is a primary object of the present invention to afford a novel multispeed driving mechanism.

Another object of the present invention is to enable a novel multispeed driving mechanism or transmission for heavy machinery to be afforded which is in the form of an accessory for such machinery, and which may be quickly and easily removed and replaced.

A transmission unit which may be used for driving heavy machinery such as, for example, mechanical metal drawing presses, and the like, is shown in the G. M. Sommer et al. United States Letters Patent No. 3,074,297, issued Jan. 22, 1963. The unit disclosed in that patent is highly practical and has met with much commercial success. It is of a type wherein a drive shaft is driven by a flywheel through a planetary gear system. The present invention enables planetary gearing to be eliminated in a transmission unit between the flywheel and the drive shaft to be driven thereby.

Other transmissions of the general type to which this invention relates have been heretofore known in the art, but have commonly had several inherent disadvantages such as, for example, being large and cumbersome in size; being subject to accidental actuation; being difficult to cool for prolonged operation; or being complicated and difficult to assemble and operate, and the like. It is an important object of the present invention to overcome such disadvantages.

Another object of the present invention is to afford a novel multispeed transmission unit wherein the parts thereof are constituted and arranged in a novel and expeditious manner effective to enable the inertia forces, which it is necessary to overcome in starting, stopping, speeding up and slowing down of the output drive shaft thereof, to be relatively low.

Another object is to afford a novel multispeed transmission unit for driving heavy machinery, which is relatively small and compact in size.

Yet another object is to enable a novel multispeed driving mechanism of the wet-clutch type to be afforded.

An object ancillary to the foregoing is to afford a novel driving mechanism of the aforementioned type which may be efficiently and effectively cooled in a novel and expeditious manner.

Another object of the present invention is to afford a novel multispeed transmission unit embodying novel high and low speed driving mechanisms.

An object ancillary to the foregoing is to enable a novel multispeed transmission unit of the aforementioned type to be afforded, wherein the parts thereof are constituted and arranged in a novel and expeditious manner effective to insure against simultaneously drivingly operating the high and low speed driving mechanisms thereof.

A further object is to enable the speed ratios of a multispeed transmission unit to be varied in a novel and expeditious manner.

Another object of the present invention is to afford a novel multispeed driving mechanism to be afforded which is practical and efficient in operation, and which may be readily and economically produced commercially.

Other and further objects of the present invention will be apparent from the following description and claims and are illustrated in the accompanying drawings, which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

Description of the drawings

In the drawings:

FIG. 1 is a side elevational view of a multispeed transmission unit embodying the principles of the present invention;

FIG. 2A is a fragmentary longitudinal view of the left portion of the transmission unit shown in FIG. 1, and mates with FIG. 2B;

FIG. 2B is a fragmentary longitudinal sectional view of the right portion of the transmission unit shown in FIG. 1, and mates with FIG. 2A;

FIG. 3 is an end elevational view of the output drive shaft of the transmission unit shown in FIG. 1, looking in the direction of the arrows 3—3 in FIG. 2B; and FIG. 4 is an enlarged, fragmentary detail sectional view of a portion of the mechanism shown in FIG. 2A.

Description of the embodiment shown herein

A multispeed driving mechanism or transmission unit 1, embodying the principles of the present invention, is shown in the drawings to illustrate the presently preferred embodiment of the present invention.

In general, the transmission unit 1 embodies an input drive shaft 2 and an output drive shaft 3 rotatably mounted in a suitable supporting frame or housing 4, FIGS. 2A and 2B. The drive shaft 2 is journaled in suitable bearings 5 and 6, and the drive shaft 3 is journaled in suitable bearings 7 and 8, FIGS. 2A and 2B.

The input drive shaft 2 embodies a rear end portion 9 which projects rearwardly from the housing 4, FIG. 2B. A flywheel 10 is mounted and secured to the rear end portion 9 in a manner which will be discussed in greater detail presently. The flywheel 10 is continuously rotated during operation of the transmission 1 to thereby correspondingly rotate the input drive shaft 2.

The output drive shaft 3 embodies a front end portion 11 which projects forwardly from the housing 4. A suitable coupling member 12 is secured to the front end portion 11 for drivingly connecting the output drive shaft 3 to a suitable driven member such as, for example, the drive shaft of a mechanical metal drawing press, or the like, not shown.

Two clutches 13 and 14 are mounted in the front end portion of the housing 4, FIG. 2A, and are operable to selectively connect the output shaft 3 to the input shaft 2, for rotation thereby, as will be discussed in greater detail presently. A brake 15 is mounted in the rear end portion of the housing 4, FIG. 2B, and is operable to stop rotation of the output shaft 3 as will be discussed in greater detail presently.

The flywheel 10 may be of any suitable type, but, preferably, is of a type such as that shown in the copending application for United States Letters Patent of Vincent J. Mankowsky and Louis F. Carrieri, Ser. No. 599,812, filed Dec. 7, 1966, which may be quickly and easily removed from the transmission unit 1 and replaced with a flywheel of different size. The flywheel 10 is secured to the rear end portion 9 of the input drive shaft 2 by means of a hub 16, which is splined to the rear end portion 9 of the input shaft 2. When the hub 16 is disposed in operative position on the shaft 2 the inner end thereof is disposed in abutting engagement with a spacer 17 disposed outwardly of the bearing 6, FIG. 2B, and is secured in such position by a plate 18 secured to the outer end of the rear end portion 9 of the drive shaft 2 by suitable fastening members such as bolts 19. The hub 16 has a radially outwardly projecting flange 20 on the inner end portion thereof, and the flywheel 10 is mounted on the hub 16 in encircling relation to the hub 16 rearwardly of the flange 20. The plate 18 is of such size that when it is mounted in operative position on the drive shaft 2 it projects radially outwardly past the inner periphery of the flywheel 10 to thereby hold the flywheel 10 in engagement with the rear face of the flange 20. Suitable fastening members such as bolts 21 extend through the flywheel 10 and the flange 20 to thereby secure the flywheel 10 to the hub 16 for rotation therewith.

With this construction, the flywheel 10 may be quickly and easily removed and replaced on the transmission unit 1 in the event that it should become damaged during operation. Also, it will be seen that with this construction a flywheel 10 may be quickly and easily removed from the transmission unit 1 and replaced with a flywheel of different size. To accomplish such a replacement of the flywheel 10, the bolts 19 and 21 and the plate 18 may be removed from the transmission unit 1, and the flywheel 10 may then be pulled off from the hub 16. If desired, the hub 16 may then be removed from the drive shaft 2 by sliding it rearwardly therefrom. The hub 16 or a replacement therefor, may be readily mounted on the drive shaft 2 by merely slipping it over the rear end portion 9. The hub 10, or a replacement therefor, may then be mounted on the hub 16 by slipping it thereonto over the rear end of the drive shaft 2; the plate 18 may be secured in operative position on the drive shaft 2 by the bolts 19; and the flywheel 10 may again be secured to the hub 16 by the bolts 21.

Two driving members in the form of pinion gears 23 and 24 are mounted on the drive shaft 2, FIG. 2A. In the transmission unit 1 shown in the drawings the gear 23 is smaller in outside diameter than the gear 24, and preferably is formed integrally with the drive shaft 2 for rotation therewith. The gear 24 is splined to the drive shaft 2 for rotation therewith.

Two driven members in the form of gears 25 and 26, FIG. 2A, are mounted in the housing 2 in radially outwardly spaced encircling relation to the output drive shaft 3. The gear 25 is journaled in suitable bearings 27 and 28 in the housing 4, FIG. 2A; and the gear 26 is journaled in suitable bearings 29 and 30 in the housing 4, FIGS. 2A and 2B.

The gears 23–26 have teeth 31–34 on the outer periphery thereof, respectively. The gears 25 and 26 are disposed in the housing 4 in radial alignment with the gears 23 and 24, respectively, with the teeth 33 and 34 meshed with the teeth 31 and 32, respectively. With this construction, whenever the drive shaft 2 is rotating the gears 23 and 24 are correspondingly rotated, to thereby rotate the gears 25 and 26 in the bearings 27 and 28 and the bearings 29 and 30, respectively.

Two sleeves 35 and 36, which form parts of the clutches 13 and 14, respectively, are splined to the output drive shaft 3 in spaced relation to each other, FIG. 2A. The sleeve 35 is held against axial movement relative to the output shaft 3 by a shoulder 37 formed on the output shaft 3 on one side thereof, and a spacer 38 disposed on the other side thereof in abutting engagement with the bearing 7. The sleeve 36 is held against axial movement relative to the output shaft 3 by a shoulder 39 formed on the output shaft 3 on one side thereof, FIG. 2A, and a spacer 40 disposed in abutting engagement with the bearing 8 on the other side thereof, FIGS. 2A and 2B. A plurality of annular clutch discs 41 are splined to the outer periphery of the sleeve 35; and a plurality of annular clutch discs 42 are similarly splined to the outer periphery of the sleeve 36, for a purpose which will be discussed in greater detail presently.

A plurality of annular clutch discs 43 are splined to the inner periphery of the gear 25, with each of the clutch discs 43 disposed between a respective pair of the clutch discs 41. Similarly, a plurality of clutch discs 44 are splined to the inner periphery of the gear 26, with each of the clutch discs 44 disposed between a respective pair of the clutch discs 42. The clutch discs 41–44 are slidably axially of the output drive shaft 3 and are operatively connected to the sleeves 35 and 36 and the gears 25 and 26, respectively, for rotation therewith.

Two annular plates 45 and 46 are secured to the sleeves 35 and 36 outwardly of the clutch discs 41 and 42, respectively, by suitable fastening members such as bolts 47. The plates 45 and 46 are disposed on the sleeves 35 and 36 in position to abuttingly engage the front and rear faces of the outermost clutch plates 41 and 42, respectively.

An annular piston 48 is slidably mounted on the output drive shaft 3 between teh sleeves 35 and 36 for reciprocation relative thereto. The piston 48 has annular flanges 49 and 50 projecting forwardly and rearwardly therefrom, respectively, with the flanges 49 and 50 disposed in position to abuttingly engage the innermost clutch discs 41 and 42, respectively, upon reciprocation of the piston 48 forwardly and rearwardly along the shaft 3. The piston 48 has an annular chamber 51 formed in the inner periphery thereof. A radially outwardly projecting flange or rib 52 is formed on the output shaft 3 and is disposed in the chamber 51. The rib 52 is sufficiently smaller in width than the chamber 51 that the piston 48 may reciprocate in the aforementioned manner longitudinally of the output shaft 3 relative to the rib 52. Preferably, the rib 52 is of such outside diameter that it fits in the chamber 51 with a relatively snug, freely slidable fit, and a suitable seal such as, for example, an O-ring 53 is disposed in the outer periphery of the rib 52 to afford a sealed connection between the rib 52 and the chamber 51.

It will be understood by those skilled in the art that a plurality of the bolts 47 extend through each of the plates 45 and 46, the bolts 47 in each plate 45 and 46 preferably being spaced from each other in a circle. Similarly, a plurality of accelerating pins extend through each of the plates 45 and 46 in spaced relation to each other between the bolts 47, one such accelerating pin 54 being shown in FIG. 2A. The accelerating pins 54 extending through the plates 45 and 46 are threaded into the sleeves 35 and 36, respectively, and project into respective openings 55 formed in the front and rear faces, respectively, of the piston 48. The openings 55 are of such diameter that the respective pins 54 are disposed therein with a relatively snug but freely slidable fit, and are of such depth that adequate space is afforded between the inner ends of the respective pins 54 and the inner ends of the openings 55 that the piston 48 may make a full reciprocation between the sleeves 35 and 36 without interference from the pins 54. The pins 54 afford a positive, mechanical connection between the piston 48 and the sleeves 35 and 36, and, therefore, between the piston 48 and the output shaft 3 effective to insure rotation of the piston 48 at all times during rotation of the output shaft 3.

Similarly, a plurality of bolts 56 extend through each of the plates 45 and 46 in spaecd relation to the bolts 47 and the pins 54 therein, one such bolt 56 being shown extending through the plate 45 in FIG. 2A. Each of the bolts 56 extending through the plates 45 and 46 is threaded into an opening 57 extending through the sleeve 35 or 36 on which the particular plate 45 or 46, respectively, is mounted. Each of the openings 57 is reduced in cross-sectional size at its inner end portion 58, as shown in FIGS. 2A and 4. A plunger 59, having an enlarged head 60 from which a reduced shank 61 projects, is mounted in each of the openings 57. The head 60 is of such size that it fits with a relatively snug but freely slidable fit in the enlarged portion of the respective opening 57, and the shank 61 is of such size that it fits in the reduced portion 58 of the opening 57 with a relatively snug but freely slidable fit. The shanks 61 on the plungers 59 are of such length that when all of the plungers 59 are engaged with the inner ends of the enlarged end portions of the respective openings 57, as shown in FIGS. 2A and 4, the free ends of the shanks 61 are disposed in abutting engagement with the piston 48, and the piston 48 is disposed in centered position between the sleeves 35 and 36. Compression coil springs 57a are disposed in each of the openings 57 between the bolt 56 and the plunger 59 therein in position to yieldingly urge each of the plungers 59 toward the piston 48. Thus it will be seen that the plungers 59, at all times, yieldingly urge the piston 48 toward centered position between the clutches 13 and 14, for a purpose which will be discused in greater detail presently.

Two substantially parallel, spaced passageways 62 and 63, are formed in the output drive shaft 3, FIG. 3, and extend longitudinally therethrough from the rear end thereof toward the front end thereof, terminating in inwardly spaced relation to the front end of the output shaft 3. Two openings or passageways 64 and 65, FIGS. 2A and 3, extend radially outwardly from the passageways 62 and 63 and open outwardly through the outer periphery of the output shaft 3 forwardly and rearwardly, respectively, of the rib 52 within the chamber 51 in the piston 48.

As will be discussed in greater detail presently, the piston 48 is adapted to be actuated so as to: (1) be disposed in centered position between the sleeves 35 and 36 to thereby disengage both of the clutches 13 and 14; (2) be moved forwardly or to the left, as viewed in FIG. 2A, to thereby disengage the clutch 14 and engage the clutch 13; and (3) be moved rearwardly or to the right, as viewed in FIG. 2A, to thereby disengage the clutch 13 and engage the clutch 14.

Actuation of the piston 48 and, therefore, of the clutches 13 and 14 may be effected and controlled by working fluid fed into and out of the passageways 62 and 63. The working fluid fed into the passageways 62 and 63 may be of any suitable type but, preferably, is a hydraulic fluid. For this purpose, a double rotary seal 66 is mounted on the rear end of the output drive shaft 3, FIG. 2B. The seal 66 has two inlets 67 and 68 which may be operatively connected to the two passageways 62 and 63, respectively, in the drive shaft 3. The inlets 66 and 67 of the rotary seal 66 may be connected to any suitable controlled source of hydraulic pressure, not shown.

With this construction, when it is desired to actuate the piston 48 from its normal at-rest position, wherein it is held by the plungers 58 in centered position between the sleeves 35 and 36, this may be readily accomplished by hydraulic fluid into either the passageway 62 or the passageway 63 from the rotary seal 66 and opening the other passageway 63 or 62 to sump.

When the piston 48 is disposed in centered position between the sleeves 35 and 36 both of the clutches 13 and 14 are disengaged. If it is desired to engage the clutch 13, this may be readily accomplished by feeding working fluid from the rotary seal 66 through the passageway 62 and the passageway 64 into the chamber 51 in the piston 48 forwardly of the rib 52 on the output shaft 3, and opening the passageway 63 to sump. This is effective to move the piston 48 to the left, as viewed in FIG. 2A, against the urging of the springs 57a acting on the plungers 59 disposed in the sleeve 35. Such movement of the piston 48 is effective to move the flange 49 thereon against the stack of clutch discs 41 and 43 and press the stack of clutch discs against the plate 45 to thereby clamp the clutch discs 41 and 43 together and engage the clutch 13. This engagement of the clutch 13 is effective to connect the output drive shaft 3 to the gear 25, and, thereby through the gear 23 to the input drive shaft 2, so that rotation of the input drive shaft 2 is effective through the gears 23 and 25 and the clutch 13 to rotate the output drive shaft 3. Also, this movement of the piston 48 to the left, as viewed in FIG. 2A, is effective to move it away from the clutch 14 so as to free the clutch discs 42 and 44 for rotation relative to each other and thus disengage the clutch 14.

If it is desired to move the piston 48 from its aforementioned position, wherein it is effective to engage the clutch 13, into a position wherein it is effective to disengage the clutch 13 and engage the clutch 14, this may be readily accomplished by opening the passageway 62 to sump, and feeding working fluid inwardly through the inlet 68 of the rotary seal 66, and thereby through the passageways 63 and 65 in the output shaft 3 into the chamber 51 in the piston 48 to the rear of the rib 52. This is effective to move the piston 48 to the right, as viewed in FIG. 2A, along the output shaft 3 into position wherein it is disposed out of engagement with the stack of clutch discs of the clutch 13, to thereby free the clutch discs 41 and 43 for rotation relative to each other and thus disengage the clutch 13. This movement of the piston 48 is also effective to move the flange 50 on the piston 48 against the stack of clutch discs 42 and 44 to thereby clamp them together between the piston 48 and the plate 46 and thus engage the clutch 14. The engagement of the clutch 14 is effective to connect the output drive shaft 3 to the gear 26, and, thereby, through the gear 24 to the input drive shaft 2. With the clutch 14 thus engaged, rotation of the input drive shaft 2 is effective through the gears 24 and 26 and the clutch 14 to rotate the output drive shaft 3.

The ports 67 and 68 in the rotary seal 66, and the passageways 62–65 in the output drive shaft 3 act both as inlets and outlets for the flow of hydraulic fluid, depending upon which way the piston 48 is moved, as will be appreciated by those skilled in the art. When it is desired to disengage both of the clutches 13 and 14 this may be readily accomplished by opening both of the ports 67 and 68 to sump and thereby free the piston 48 for movement by the spring urged plungers 59 in the sleeves 35 and 36 into centered position between the sleeves 35 and 36, in which position the piston 48 is ineffective to engage either the clutch 13 or the clutch 14. However, it will be observed that even with both of the clutches 13 and 14 disengaged, the gears 23–26 and the clutch discs 43 and 44 all are rotating at all times during rotation of the input drive shaft 2.

The brake 15 includes a sleeve 69 mounted and splined to the rear end portion of the output drive shaft 3 in abutting engagement with the rear edge of a spacer 70 mounted on the output shaft 3 in retaining engagement with the bearing 8, FIG. 2B. A plurality of annular brake discs 71 are splined to the outer periphery of the sleeve 69 for rotation therewith. The brake discs 71 are slidable axially of the sleeve 69.

A plurality of other annular brake discs 72 are splined to the inner periphery of a cavity 73 formed in the supporting frame or housing 4, FIG. 2B, with each of the brake discs 72 disposed between a respective pair of the brake discs 71. The brake discs 72 are held against rotation by the splined engagement with the housing 4, but are slidable in the cavity 73 longitudinally of the output drive shaft 3.

The transmission unit 1 embodies a plurality of pistons 74 disposed in spaced relation to each other around the drive shaft 3 for a purpose which will be discussed in greater detail presently, one such piston being shown in FIG. 2B. Each of the pistons 74 is disposed in a respective opening 76 formed in the supporting frame 4. Each opening 76 includes an enlarged portion 77 and a reduced portion 78, with the reduced portion 78 opening directly toward the stack of brake discs 71 and 72, and with the end of the enlarged portion 77 remote from the reduced portion 78 being closed by a cover plate 79 secured to the supporting frame 4 by suitable fastening members such as bolts 80.

Each of the pistons 74 includes an enlarged body portion 81 from which two reduced end portions 82 and 83 extend in opposite directions. The enlarged body portion 81 is mounted in the enlarged portion 77 of a respective opening 76 with a relatively snug, freely slidable fit, and with the end portion 82 projecting toward the cover plate 79 and the end portion 83 extending through the reduced portion 78 of the opening 76. The enlarged body portion 81 is so disposed on each respective piston 74 that the piston 74 may be reciprocated between a rearwardmost position wherein the free end of the end portion 83 clamps the stack of brake discs 71 and 72 against the flange 75, to thereby engage the brake 15, and a forwardmost position wherein the end portion 83 is ineffective to so clamp the brake discs 71 and 72 against the flange 75, to thereby disengage the brake 15. A compression coil spring 84 is mounted in each of the openings 76 between the cover plate 79 thereon and the enlarged body portion 81 of the piston 74 disposed therein, in position to yieldingly urge the respective pistons 74 toward the aforementioned position wherein they are effective to clamp the brake discs 71 and 72 against the flange 75.

Actuation of the pistons 74 against the urging of the springs 84 preferably is effected and controlled hydraulically. For this purpose, a passageway 85 extends from the rear face of the supporting frame 4 to an annular recess 86 formed therein, FIG. 2B. A plurality of elongated passageways 87 connect the recess 86 to the ends of the enlarged portions 77 of the respective openings 76 adjacent to the reduced portions 78 thereof, to the rear of the enlarged body portions 81 of the respective pistons 74. The passageway 85 may be connected to any suitable controlled source of hydraulic pressure, not shown.

With this construction, when the passageway 85 is open to sump, so that no hydraulic pressure is exerted on the rear or right side, as viewed in FIG. 2B, of the enlarged portions 81 of the pistons 74, the springs 84 are effective to hold the pistons 74 in the aforementioned position effective to clamp the brake discs 71 and 72 against the flange 75, to thereby apply a braking force to the sleeve 69 and thereby to the output drive shaft 3. When it is desired to release the brake 15 this may be readily accomplished by feeding suitable working fluid, such as, for example, hydraulic fluid, through the passageway 85, the recess 86, and the passageways 87 into the openings 76 to thereby move the pistons 74 forwardly or to the left, as viewed in FIG. 2B, against the urging of the springs 84 away from the brake discs 71 and 72 to thereby release the brake 15. Subsequently, when it is again desired to engage the brake 15, this may be readily accomplished by opening the passageway 85 to sump and thereby free the pistons 74 for movement by the springs 84 into the aforementioned brake-engaging position.

The transmission unit 1 shown in the drawings is of the wet-clutch type. The housing 4 has an inlet opening 88 formed in the upper rear end portion thereof, FIG. 2B, for feeding oil thereinto for both cooling and lubricating purposes. A passageway 89 extends from the inlet opening 88 to an annular recess 90 formed in the housing 4, and a plurality of passageways 91 extend radially through the spacer 70 from the recess 90 to an annular recess 92 formed in the outer periphery of the output drive shaft 3. Two passageways 93 and 94, FIGS. 2B and 3 extend radially inwardly from the recess 92 and connect at their inner ends with two substantially parallel passageways 95 and 96, respectively. The passageways 95 and 96 extend longitudinally through the output drive shaft 3 from the front end thereof, and terminate at their rear ends in forwardly spaced relation to the rear ends of the output shaft 3, FIGS. 2A and 2B. The front ends of the passageways 95 and 96 are closed by suitable plugs 97 and 98, respectively.

A plurality of passageways 99, FIGS. 2A and 2B, extend radially outwardly through the output shaft 3, from the passageways 95 and 96 and terminate at their outer ends in communication with respective annular recesses 100 formed in the inner peripheral surfaces of the sleeves 35, 36 and 69 of the clutches 13 and 14 and the brake 15, respectively. Each of the sleeves 35, 36 and 69 has a plurality of elongated passageways 101 formed therein and spaced therearound inwardly of the clutch discs 41 and 42 and the brake discs 71, respectively, two such passageways 101 being shown in FIGS. 2A and 2B. In each of the sleeves 35, 36 and 69, the passageways 101 therein are connected to the recess 100 therein by a plurality of passageways 103, and are connected to the outer periphery of the respective sleeves 35, 36 and 69 by a plurality of orifices 102. The outer ends of the passageways 101 are closed by suitable plugs 104 so that any oil flowing into the passageways 101 from the passageways 95 and 96 cannot escape therefrom except through the orifices 102.

A plurality of other passageways 105 extend radially outwardly through the output drive shaft 3 from each of the passageways 95 and 96 and terminate at their outer ends in communication with the bearings 7 and 8 for directly feeding oil thereto.

The front end of the input drive shaft 2 is covered by a suitable cap 106 secured to the housing 4 by suitable fastening members such as bolts 107, and the rear end of the input shaft 2 and the ends of the output shaft 3 are suitably sealed in the housing 4, such as, for example, by oil seals 108 so as to prevent leakage of oil along the shafts 2 and 3 outwardly from the housing 4.

An oil outlet 109 is afforded in the lower portion of the housing 4, FIG. 1, through which oil may be discharged from the housing 4 for draining the same, or for feeding the oil back to sump, not shown for recirculation through the transmission unit 1.

With this construction, oil may be fed into the housing 4 from a suitable source of supply, not shown, through the inlet 88. The oil may be fed into the inlet 88 at a suitable pressure such as, for example, 40 to 100 pounds per square inch. From the inlet 88 the oil passes downwardly through the passageways 89–91 into the recess 92 in the output drive shaft 3, and from there through the passageways 93 and 94 into the passageways 95 and 96 extending longitudinally through the output shaft 3. From the passageways 95 and 96 the oil is fed outwardly through the passageways 105 to thereby lubricate and cool the bearings 7 and 8. Also, the oil is fed outwardly from the passageways 95 and 96 through the passageways 99–101 and 103 and the orifices 102 disposed within the clutches 13 and 14 and the brake 15 to thereby cool and lubricate the latter. From the bearings 7 and 8, the clutches 13 and 14 and the brake 15 the oil flows downwardly through the housing 4 to thereby cool and lubricate the other working parts of the transmission unit 1 disposed therein, and including the bearings 5 and 6, the bearings 27–30 and the gears 23–26. The oil which flows downwardly into the bottom of the housing 4 may be discharged therefrom through the outlet 109. Preferably, the discharged oil is fed back to the source of supply thereof, not shown, for recirculation through the transmission unit 1.

Preferably, the transmission unit 1 shown in the drawings is operated as a "wet sump" unit wherein the rate of flow of oil therethrough is such that the lower portion of the housing 4 is filled with oil to a level wherein the teeth 31 and 32 on the bottom of the gears 23 and 24 dip into the oil to thereby afford additional cooling and lubrication of the gears 23–26. Also, with the gears 23 and 24 rotating through oil in the bottom of the housing 4, they act as splash rings to thereby throw the oil upwardly into the housing 4 to thereby further bathe the parts of the transmission unit 1 with oil. This bathing of the parts of the transmission unit 1 affords lubrication therefor, and in addition, assists in cooling the same.

*Résumé of operation*

In the operation of the transmission unit 1, the coupling member 12 on the output drive shaft 3 may be operatively connected to the member to be driven thereby, such as, for example, the drive shaft of a mechanical metal working press, or the like, not shown, with the supporting frame or housing 4 held stationary by mounting it on a suitable base, not shown, or connecting it to the frame of the aforementioned press. In the normal at-rest condition of the transmission unit 1, the ports 67 and 68 on the rotary seal 66 are open to sump so that no hydraulic pressure is exerted on the piston 48, and the latter, therefore, is held by the plungers 58 in centered position between the sleeves 35 and 36, and the clutches 13 and 14 are disengaged. Also, in the normal at-rest condition of the transmission unit 1, the inlet 85 is open to sump so that no hydraulic pressure is exerted on the pistons 74 and the latter are held by the springs 84 in position to clamp the brake discs 71 and 72 against the flange 75 to thereby engage the brake 5 and hold the outlet drive shaft 3 against rotation.

With the transmission unit 1 in this condition, the drive shaft 2 may be rotated without driving the drive shaft 3. Such rotation of the drive shaft 2 may be effected in any suitable manner such as, for example, rotating the flywheel 10 by any suitable means, such as, for example, by a belt, not shown. Such rotation of the input drive shaft 2 is effective to rotate the gears 23 and 24 thereon, to thereby rotate the gears 25 and 26 and the clutch discs 43 and 44 at all times during rotation of the drive shaft 2. In the transmission unit 1 shown in the drawings, the gear 23 is smaller in diameter than the gear 24, and the gear 25 is larger in diameter than the gear 26 so that the gear 25 is rotated by the drive shaft 2 at a lower rate of speed than that of the gear 26.

With this construction, if it is desired to rotate the output drive shaft 3 at a low rate of speed working fluid may be fed into the port 85 to thereby move the pistons 74 against the urging of the spring 84 and release the brake 15, and, with the port 68 in the rotary seal 66 open, working fluid may be fed through the port 67, and thus through the passageways 62 and 64 into the chamber 51 in the piston 48 to thereby move the piston 48 to the left, as viewed in FIG. 2A, into position effective to engage the clutch 13. Engagement of the clutch 13 is effective to couple the output drive shaft 3 to the gear 25 for rotation thereby.

If it is desired to increase the speed of rotation of the output drive shaft 3 this may be readily accomplished by opening the port 67 of the rotary seal 66 to sump and feeding working fluid into the port 68 for passage through the passageways 63 and 65 into the chamber 51 in the piston 48. The working fluid thus fed through the passageways 63 and 65 into the chamber 51 is operable to move the piston 48 to the right, as viewed in FIG. 2A, into position to release the low speed clutch 13 and engage the high speed clutch 14. Engagement of the clutch 14 is effective to couple the output drive shaft 3 to the gear 26 for rotation thereby.

Thus it will be seen that the clutches 13 and 14 afford low speed and high speed clutches, respectively, for coupling the input drive shaft 2 to the output drive shaft 3, and the speed of rotation of the output drive shaft 3 may be quickly and easily varied between high and low speeds by merely causing the piston 48 to be moved to the left or right, in the aforementioned manner, into position to engage the clutches 13 and 14, respectively. Also, it will be seen that transmission units having different high and low speeds of operation from those of the transmission unit 1 shown in the drawings may be readily afforded by merely using gears of different sizes to afford different gear ratios for the gear trains 23 and 25, and 24 and 26.

The piston 48 and the clutches 13 and 14 are so disposed in the housing 4 that it is impossible for both of the clutches 13 and 14 to be simultaneously engaged, the piston 48 moving out of position effective to engage the clutch 13 or 14 prior to the time that it moves into position to engage the other clutch 14 or 13, during reciprocation of the piston 48 on the drive shaft 3.

If, during operation of the transmission unit 1, it is desired to stop rotation of the output drive shaft 3 without affecting the rotating of the drive shaft 2, this may be readily accomplished by first opening both of the ports 67 and 68 of the rotary seal 66 to sump and thereby permit the piston 48 to be moved into centered position by the plungers 58, so that both of the clutches 13 and 14 are disengaged, and then opening the port 85 to sump, to thereby permit the piston 74 to be moved by the spring 84 into position to engage the brake 15 and thus stop rotation of the output drive shaft 3.

If, during operation of the transmission unit 1, it is desired to stop rotation of the input drive shaft 2, this may be readily accomplished by engaging either the clutch 13 or the clutch 14, in the aforementioned manner, and then engaging the brake 15, in the abovedescribed manner. The engagement of the brake 15 is effective to stop rotation of the output drive shaft 3, and this, through the aforementioned engaged clutch 13 or 14 is effective to stop rotation of the input drive shaft 2.

In the operation of the transmission unit 1, with the drive shaft 2 rotating at a constant speed, the gears 23–26 and the clutch discs 43 and 44 of the clutches 13 and 14, respectively, are at all times rotating at a constant speed. Under these conditions, during starting, stopping, speeding up and slowing down of a unit being driven by the transmission unit 1, it is only the speed of rotation of the output drive shaft 3, and the parts carried thereby, which is affected. The parts carried by the output drive shaft 3 are of relatively small mass, being primarily the coupling member 12, the sleeves 35, 36 and 69, the clutch discs 41 and 42 and the brake discs 71. Thus it will be seen that relatively small inertia forces are involved in any such change of speed of the drive shaft 3. This, of course, is of importance both in efficiency of operation of the transmission unit 1 and in the operating life expectancy thereof.

From the foregoing it will be seen that the present invention affords a novel transmission unit which is so constructed that it may be relatively small and compact in size while affording a high output capacity effective to drive relatively heavy machinery such as, for example, mechanical metal drawing presses, and the like.

In addition, it will be seen that the present invention affords a novel transmission unit wherein the speed of rotation of the output drive shaft thereof may be varied and controlled in a novel and expeditious manner.

Also, it will be seen that the present invention affords a novel transmission unit wherein the input thereof may be coupled to, and uncoupled from, the output thereof in a novel and expeditious manner.

In addition, it will be seen that the present invention affords a novel transmission unit which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A multispeed driving mechanism comprising
  (a) a housing,
  (b) an elongated output shaft rotatably mounted in said housing,
  (c) an elongated input shaft rotatably mounted in said housing,
  (d) two drive means mounted on said input shaft for rotation therewith
  (e) two driven means
    (1) rotatably mounted in said housing in encircling relation to said output shaft for rotation around the longitudinal axis of said output shaft, and
    (2) operatively connected to respective ones of said drive means for rotation thereby during such rotation of said drive means with said input shaft, and
  (f) other means mounted no said output shaft and operatively connected thereto for rotation therewith for selectively operatively connecting respective ones of said driven means to said output shaft and thereby drive said output shaft at the speed of rotation of said respective one driven means upon said rotation of the latter.
2. A multispeed driving mechanism as defined in claim 1, and in which
  (a) said shafts are disposed in substantially parallel relation to each other.
3. A multispeed driving mechanism as defined in claim 1, and in which
  (a) each of said drive means comprises a gear mounted on and secured to said input shaft for rotation therewith, and
  (b) each of said driven means comprises another gear
    (1) rotatably mounted in said housing for rotation around the longitudinal axis of said output shaft and
    (2) operatively connected to a respective one of said first mentioned gears for rotation thereby upon said rotation of the latter.
4. A multispeed driving mechanism as defined in claim 3, and in which
  (a) each of said gears rotates at all times during said rotation of said input shaft.
5. A multispeed driving mechanism as defined in claim 4, and in which
  (a) each of said other gears have clutch discs secured thereto and rotatable therewith, and
  (b) said other means comprise
    (1) two sets of other clutch discs mounted on and secured to said output shaft for rotation therewith, and
    (2) means for selectively moving said first mentioned clutch discs on respective ones of said other gears and said other clutch discs in respective ones of said sets into operative engagement with each other to thereby selectively operatively connect said output shaft to respective ones of said other gears.
6. A multispeed driving mechanism as defined in claim 5, and in which
  (a) said means for selectively moving comprises a member
    (1) mounted between said two other gears and between said two sets, and
    (2) reciprocable between
      (a') one position effective to so operatively engage said clutch discs on one of said other gears with said clutch discs in one of said sets and ineffective to so engage said clutch discs on the other of said other gears with said clutch discs in the other of said sets, and
      (b') another position effective to so operatively engage said clutch discs on said other of said other gears with said clutch discs in said other set and ineffective to operatively engage said clutch discs on said one of said other gears with said clutch discs in said one set.
7. A multispeed driving mechanism as defined in claim 6, and in which
  (a) said member comprises a piston reciprocable between said one position and said other position, and
  (b) said other means comprises means for feeding working fluid against said piston for reciprocating the latter between said one position and said other position.
8. A multispeed driving mechanism as defined in claim 7, and in which
  (a) said piston embodies a chamber therein,
  (b) said output shaft includes a substantially radially outwardly projecting rib disposed in said chamber, and
  (c) said means for feeding working fluid comprises two passageways extending through said output shaft and connected to said chamber on opposite sides of said rib for selectively feeding such working fluid into and out of said chamber on opposite sides of said rib.
9. A multispeed driving mechanism as defined in claim 8, and which includes
  (a) a flywheel mounted on and secured to said input shaft for rotating the latter.
10. A multispeed driving mechanism as defined in claim 9, and which includes
  (a) brake means mounted on said output shaft for stopping rotation of the latter.
11. A multispeed driving mechanism as defined in claim 1, and which includes
  (a) brake means mounted on said output shaft for stopping rotation of the latter.
12. A multispeed driving mechanism as defined in claim 11, and in which
  (a) said brake means comprises
    (1) brake plates mounted on said output shaft and secured thereto for rotation therewith,
    (2) other brake plates nonrotatably mounted in said housing, and
    (3) means for moving said first mentioned brake plates and said other brake plates into operative engagement with each other to thereby apply a braking force to said output shaft.
13. A multispeed driving mechanism as defined in claim 12, and in which
  (a) said means for moving comprises
    (1) a piston reciprocable in said housing into and out of a position effective to press said first mentioned brake plates and said other brake plates into said operative engagement with each other, and (2) spring means operatively engaged with said piston to yieldingly urge said piston into said position.

14. A multispeed driving mechanism as defined in claim 2, and in which (a) said driven means each include clutch plates, and (b) said other means includes other clutch plates secured to said output shaft and selectively engageable with said clutch plates on respective ones of said driven means.

15. A multispeed driving mechanism as defined in claim 14, and in which (a) all of said clutch plates of said driven means rotate around the longitudinal axis of said output shaft at all times during rotation of said input shaft.

References Cited
UNITED STATES PATENTS

| | | | |
|---|---|---|---|
| 2,912,084 | 11/1959 | Meyercordt | 74—364 |
| 2,953,942 | 9/1960 | Schwartz et al. | 74—364 |
| 3,181,385 | 5/1965 | Siler | 74—364 |

DONLEY J. STOCKING, *Primary Examiner.*

HENRY S. LAYTON, *Assistant Examiner.*

U.S. Cl. X.R.

33—172; 73—105